(12) United States Patent
Morel

(10) Patent No.: US 6,498,814 B1
(45) Date of Patent: Dec. 24, 2002

(54) DRIFT-FREE TRANSCODER AND RELATED METHOD

(75) Inventor: Anthony Morel, Saint Maur des Fosses (FR)

(73) Assignee: Koninklijke Philips Electronics N.V., Eindhoven (NL)

(*) Notice: Subject to any disclaimer, the term of this patent is extended or adjusted under 35 U.S.C. 154(b) by 228 days.

(21) Appl. No.: 09/615,880

(22) Filed: Jul. 13, 2000

(30) Foreign Application Priority Data

Jul. 20, 1999 (EP) .............................. 99401822

(51) Int. Cl.⁷ ............................................... H04N 7/12
(52) U.S. Cl. ................................................ 375/240.12
(58) Field of Search ....................... 375/240.02, 240.03, 375/240.12, 240.13, 240.15, 240.22, 245; 348/404.1, 409.1, 394.1; H04N 7/12

(56) References Cited

U.S. PATENT DOCUMENTS

| 5,537,440 A | | 7/1996 | Eyuboglu et al. | ............ 375/245 |
| 5,870,146 A | * | 2/1999 | Zhu | ............ 375/240.03 |
| 6,181,743 B1 | * | 1/2001 | Bailleul | ............ 375/240 |
| 6,201,844 B1 | * | 3/2001 | Bailleul | ............ 375/372 |
| 6,215,824 B1 | * | 4/2001 | Assuncao | ............ 375/240.26 |
| 6,329,934 B1 | * | 12/2001 | Bailleul | ............ 341/51 |
| 6,456,661 B1 | * | 9/2002 | Morel | ............ 375/240.16 |

FOREIGN PATENT DOCUMENTS

WO    WO98/19460    * 5/1998    ............ H04N/7/26

OTHER PUBLICATIONS

Kleihorst et al, Implementation of DCT–domain motion estimation and compensation, Oct. 1998, IEEE, pp. 53–62.*
Koc et al, DCT–Based Motion Estimation, 1998, IEEE, pp. 948–965.*
Assunncao et al., IEEE Trns. on CSVT, vol. 8, No. 8., Dec. 1998.

* cited by examiner

Primary Examiner—Nhon Diep
(74) Attorney, Agent, or Firm—Russell Gross

(57) ABSTRACT

The invention relates to a transcoder comprising a drift compensating loop (DCL) for compensating a drift signal (Ei) introduced in the transcoding path by a quantization operation (Q2). This drift compensation loop performs a motion compensation of a signal (F1) issuing from a previous dequantization (IQ1) resulting in a prediction signal (P1). The motion compensation is based on the drift signal stored in a memory unit (MEM). The drift signal and the prediction signal may be conveyed in an interlaced or de-interlaced structure. According to the invention, an AMC unit adapts the motion compensation operation with the de-interlaced or interlaced structures of the drift and prediction signals.

4 Claims, 5 Drawing Sheets

$$\Gamma_{16} = \begin{bmatrix} 1 & 0 & \cdots\cdots\cdots\cdots & 0 \\ 0 & 0 & 1 & \cdots\cdots\cdots\cdots & 0 \\ \vdots & & & & \vdots \\ 0 & \cdots\cdots & 0 & 0 & 1 & 0 \\ 0 & 1 & \cdots\cdots\cdots & 0 \\ 0 & 0 & 0 & 1 & 0 & \cdots & 0 \\ 0 & & & & & 0 \\ 0 & & & & & 0 \\ 0 & & & & & 0 \\ 0 & 0 & 0 & 0 & 0 & 0 & 1 \end{bmatrix}$$

DRIFT-FREE TRANSCODER AND RELATED METHOD

FIELD OF THE INVENTION

The invention relates to a method of transcoding an input coded signal comprising the steps of:
- decoding the input coded signal leading to a decoded quantized signal,
- dequantizing the decoded quantized signal leading to a decoded signal,
- requantizing a compensated signal leading to a requantized signal,
- reencoding the requantized signal leading to a reencoded signal,
- compensating a drift introduced in the reencoded signal by said requantization step, said compensation step being performed between said dequantizing and requantizing steps.

The invention also relates to a transcoder for carrying out said method.

The invention may be used, for example, for the transcoding of an MPEG-compressed signal of a given bit rate into another MPEG-compressed signal of a lower bit rate.

BACKGROUND ART

A transcoder may convert a compressed signal of a given bit rate into a compressed signal of a lower bit rate. Basically, a transcoder used for such a purpose consists of a cascaded decoder and encoder. This combination is rather complex and this complexity can be significantly reduced. In the particular case of video signals, some other aspects have to be taken into account. A coded video signal consists of a succession of encoded frames, where each frame is subdivided into a two-dimensional array of macroblocks, each macroblock being composed of blocks. A frame may be in the spatial domain, which is the pixel domain, and is transmitted in the frequency or transform domain, which results from a Discrete Cosine Transform (DCT) of the frame in the spatial domain. Besides, any frame may be separated into two fields: the top field formed by the odd lines of the frame and the bottom field formed by the even lines of the frame. A macroblock may be conveyed in two different formats: an interlaced format, hereinafter referred to as frame format, and a de-interlaced format, hereinafter referred to as field format. In the frame format, a macroblock is composed of lines from the two fields alternately and each DCT-block of the macroblock is formed by data from the two fields. In the field format, a macroblock is composed of lines from the two fields, and each DCT-block of the macroblock is formed by data from only one of the two fields.

A possible transcoder for carrying out a method of transcoding such as described in the introduction is proposed by Assuncao et al., IEEE Trans. on CSVT, vol. 8, no. 8, December 1998. This paper discloses a particular transcoder dedicated to MPEG-2 video signals. A transcoder 1 according to the prior art, such as shown in FIG. 1, comprises a decoding part and a subsequent coding part with motion compensation. The decoding part is composed of a variable length decoder VLD and a dequantizer IQ1. The coding part is composed of a quantizer Q2, a drift compensation loop DCL and a variable length encoder VLC. Quantization by Q2 introduces an error macroblock E or drift for each decoded macroblock F to be quantized into the transcoding path of the transcoder 1. This error macroblock E is derived in the drift compensation loop DCL as follows. The error macroblock E is derived at the output of a tap adder S2 as the difference between a compensated macroblock to be quantized provided to Q2 and a dequantized macroblock issuing from a dequantizer IQ2. This error macroblock E may be provided either in the frame or in the field format. In the latter case, the macroblock is converted into the frame format in a field/frame converter f/F. The error macroblock is then stored in the frame format in a memory unit MEM with all the other error macroblocks corresponding to the same frame. Thus the error macroblocks of the entire frame are stored in the memory unit MEM, and so are the error macroblocks of the previously transmitted frame. All these stored macroblocks may be used as references for the prediction by motion compensation of the decoded macroblock F in a MC-DCT unit. A prediction macroblock of the decoded macroblock F is finally obtained and added to the decoded macroblock F in a tap adder S1, resulting in a compensated decoded macroblock passed through Q2 for quantization.

The transcoder described by the prior art includes a drift compensation loop performing motion compensation exclusively on macroblocks in the frame format. The transcoder comprises a field/frame converter located separately from the motion compensation unit and upstream of the memory unit, so that the macroblocks may be stored in the frame format. The method of transcoding carried out in this transcoder involves many separate operations which are time consuming and which result in a complex hardware implementation.

SUMMARY OF THE INVENTION

It is an object of the invention to provide a method of transcoding which involves a reduced number of operations for time efficiency and leads to a simple hardware implementation of a transcoder for carrying out the method.

According to the invention, therefore, the drift compensation step of a method of transcoding such as described in the introduction comprises at least the consecutive sub-steps of:
- deriving an error signal corresponding to said drift,
- deriving a prediction signal of the decoded signal by means of a simultaneous motion compensation and field/frame conversion based on the error signal and adapted to the interlaced or non-interlaced transmission mode of the error signal and of the prediction signal,
- subtracting the derived prediction signal from the decoded signal, leading to the compensated signal to be requantized.

The drift compensation step of a method according to the invention comprises a motion compensation combined with field/frame conversion. The field/frame conversion operation mentioned here concerns a conversion from the field format into the frame format as well as a conversion from the frame format into the field format. In fact, the error macroblock resulting from quantization is stored in the format in which it was provided without any necessary prior conversion into the frame or field format. The motion compensation operation may be performed indiscriminately on a macroblock in the field format or on a macroblock in the frame format. Similarly, the motion compensation operation may provide indiscriminately a macroblock in the field format or a macroblock in the frame format. Besides, the motion compensation step is performed on the basis of frames stored in the memory unit, whose macroblocks can either be stored in the frame format or in the field format. Thus the field/frame conversion operation is performed simultaneously with the motion compensation, depending on whether a field or a frame format is required for the input and output macroblocks. The combined motion compensation and field/frame conversion step may be considered as an adaptive motion compensation step.

An advantage of the present invention is therefore a reduction in the number of operations and thus the cost as compared with the prior art. Involved operations in the invention are combined, and as a result a hardware implementation of the method according to the invention is simplified.

In an embodiment of the invention, the adaptive motion compensation step is carried out on frames in the transform domain. An advantage of transcoding frames in the transform domain is memory reduction.

Furthermore, the invention also relates to a transcoder for carrying out a method in accordance with the invention.

BRIEF DESCRIPTION OF THE DRAWINGS

The particular aspects of the invention will now be explained with reference to the embodiments described hereinafter and considered in connection with the accompanying drawings, in which.

DETAILED DESCRIPTION OF THE INVENTION

Figure 1:
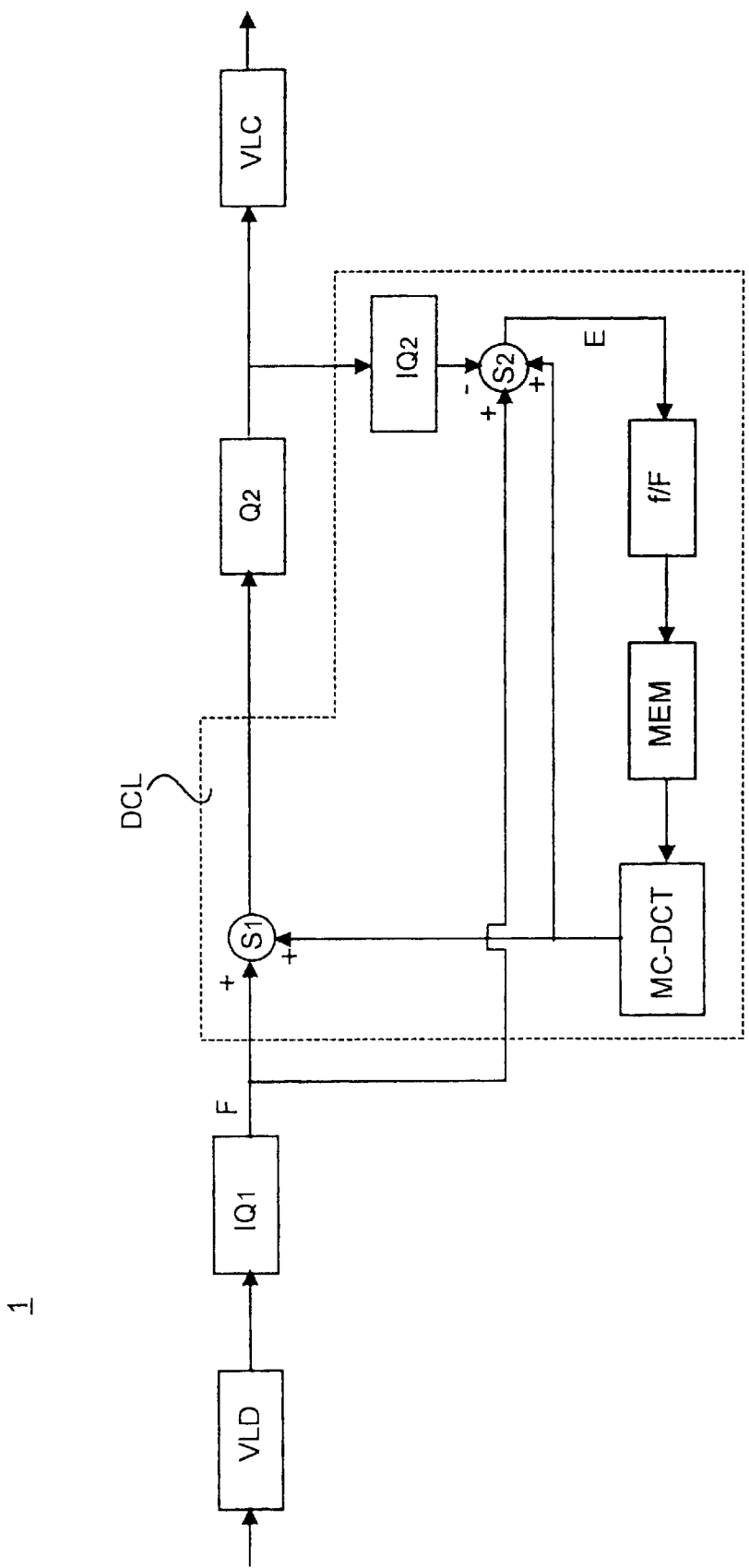
FIG. 1 is a diagram of a transcoder for carrying out a method according to the prior art.
Figure 2:
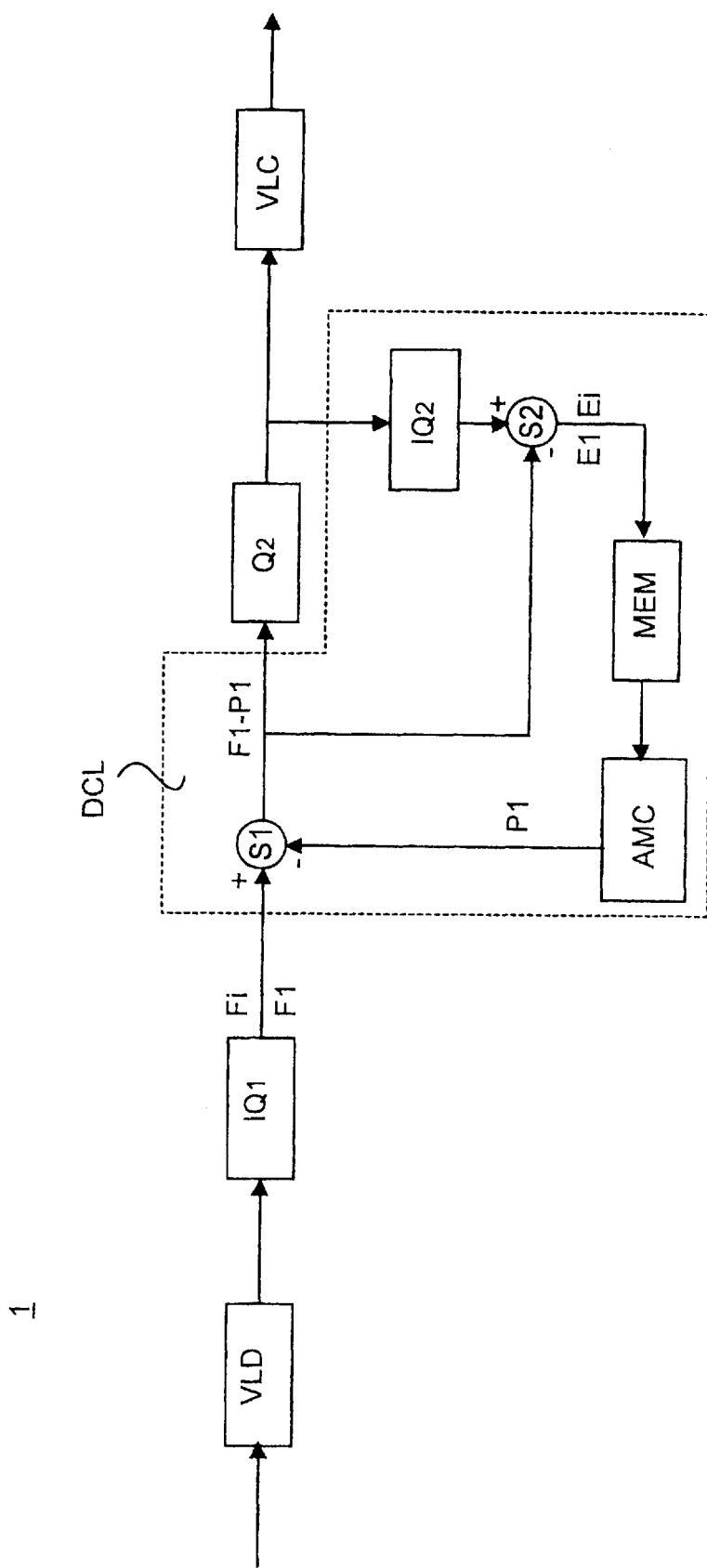
FIG. 2 is a diagram of a transcoder for carrying out a method according to the invention.

FIG. 2 shows an embodiment of a transcoder 1 for carrying out a method according to the invention. The transcoder 1 is dedicated to the conversion of a digital video bit stream of a first bit rate R1 into a digital video bit stream of a second lower bit rate R2. A variable length decoder VLD first decodes a coded bit stream of the bit rate R1. The output bit stream of the decoder VLD consists of a succession of n decoded quantized macroblocks in the frequency domain transmitted to a dequantizer IQ1. The dequantizer IQ1 provides a decoded macroblock Fi (i=1. . . n) for each quantized macroblock received from the VLD unit. The VLD unit together with the dequantizer IQ1 forms the decoding part of the transcoder 1.

The transcoder 1 also comprises a coding part for converting the received bit stream of the bit rate R1 into a bit stream of the bit rate R2. To this end, the transcoder 1 comprises a quantizer Q2 for requantizing the received dequantized and decoded bit stream issuing from IQ1. As already said, a drift is introduced into the requantization step of a transcoder. Indeed, the quantizer Q2 introduces an error macroblock Ei or drift into the transcoding path of the transcoder 1. This error macroblock Ei is derived and compensated in a drift compensation loop DCL as follows. In the loop DCL, any macroblock which was quantized by Q2 is dequantized in a next step by a dequantizer IQ2, the quantization step of IQ2 being the same as the one used by the quantizer Q2. The error macroblock Ei is obtained at the output of a tap adder S2 as the difference between the macroblock issuing from IQ2 and the macroblock initially provided to Q2. In video coding, any macroblock may be encoded according to an Intra mode without any reference to another picture or may be encoded according to an Inter mode with references to previous and future pictures. A macroblock belonging to an I-frame is encoded according to an Intra mode. A macroblock belonging to a P-frame may be encoded with reference to a previous I or P-frame. A macroblock belonging to a B-frame may be encoded with references to a previous I or P-frame and to the next I or P-frame. A P or B-macroblock is transmitted along the transcoding path as a residual related to a set of frames used as references. Thus, when a P or B-macroblock is provided by the decoding stage of the transcoder, the provided data are related to previous or future reference macroblocks. Moreover, any macroblock quantized by Q2 is subject to the drift previously mentioned and as a result any macroblock used as a reference is slightly modified after quantization, and the error would propagate unless compensated. In order to correct this introduced drift, any macroblock conveyed in the guise of a reference to other macroblocks has to be motion compensated in the DCL loop on the basis of the erroneous macroblock, so that the drift does not propagate.

Thus, when a macroblock F1 is provided by the dequantizer IQ1 to the quantizer Q2, an error macroblock E1, introduced during requantization by Q2, is derived in the tap adder S2. In this embodiment, the macroblock F1 may be provided indiscriminately in the frame format or in the field format, depending on the way the original bit stream is conveyed along the transcoding path. The error macroblock E1 is consequently issued in the same format in which the macroblock F1 is conveyed. The erroneous macroblock E1 is then stored in a memory unit MEM. At the same time a motion compensation is performed in an AMC unit. The motion compensation operation, according to the invention, is combined with a field/frame conversion in the frequency domain. These simultaneous motion compensation and field/frame conversion are hereinafter referred to as an adaptive motion compensation step. It results in a prediction macroblock P1 of the decoded macroblock F1 at the output of the AMC unit. The field/frame conversion in the adaptive motion compensation step is optional and depends on the transmission format required for the output or for the input of the AMC unit. Indeed, the motion compensation is first performed on the basis of frames previously stored in the memory unit MEM, and the macroblocks of these frames, according to the invention, may have been stored in the frame format as well as in the field format. Besides, the prediction macroblock P1 may be expected either in the frame format or in the field format. The motion compensation step is also performed on the basis of motion vectors MV derived during a previous encoding not mentioned here and received from the VLD unit. Thus the adaptive motion compensation step of a method of transcoding according to the invention is self-adapted to any kind of macroblock format. A detailed description of this adaptive motion compensation step will be given in a paragraph further below.

The prediction macroblock P1 of the macroblock F1 is finally obtained in the desired format at the output of the AMC unit. This prediction macroblock P1 is in a tap adder S1 subtracted from the macroblock F1, so that a compensated macroblock F1–1 can be transmitted to the quantizer Q2. After requantization by Q2 the compensated macroblock is transmitted to a variable length encoder, a VLC unit in FIG. 2, for re-encoding.

As stated above, only a macroblock conveyed in the guise of a reference to other macroblocks needs to be motion-compensated so that the error introduced by quantization by Q2 in the macroblocks used as references is not propagated. Thus a macroblock belonging to an I-frame does not need to be compensated and may be passed directly from the dequantizer IQ1 to the quantizer Q2 and to the VLC unit for further encoding. The corresponding error macroblock introduced by the quantization step Q2 is, however, stored in the memory unit MEM. In an embodiment of the invention, the adaptive motion compensation performed in the AMC unit for a macroblock belonging to a P-frame and provided by IQ1 uses only a past reference picture. Thus only the erroneous macroblocks corresponding to the macroblocks of the past reference picture need to be stored in the memory unit MEM for the prediction of such a macroblock. A prediction for a macroblock provided by IQ1 and belonging to a B-frame conventionally requires the erroneous macroblocks corresponding to the macroblocks of the previous I or P-picture and of the next I or P-picture, respectively. In an embodiment of the invention, the contribution of the erroneous macroblocks belonging to the previous I or P-frame is set to zero, and consequently only the erroneous macroblocks corresponding to the future I or P-frame need to be stored in the memory MEM. Given this assumption, the size of the memory unit MEM can be reduced, because only the erroneous macroblocks of a single frame need to be stored.

The prediction made in the adaptive motion compensation step mentioned above may be obtained by many different scenarios. Indeed, the prediction macroblock may be obtained either from a frame prediction or from a field prediction on the basis of macroblocks, which may be either in the frame or in the field format.

Figure 3:
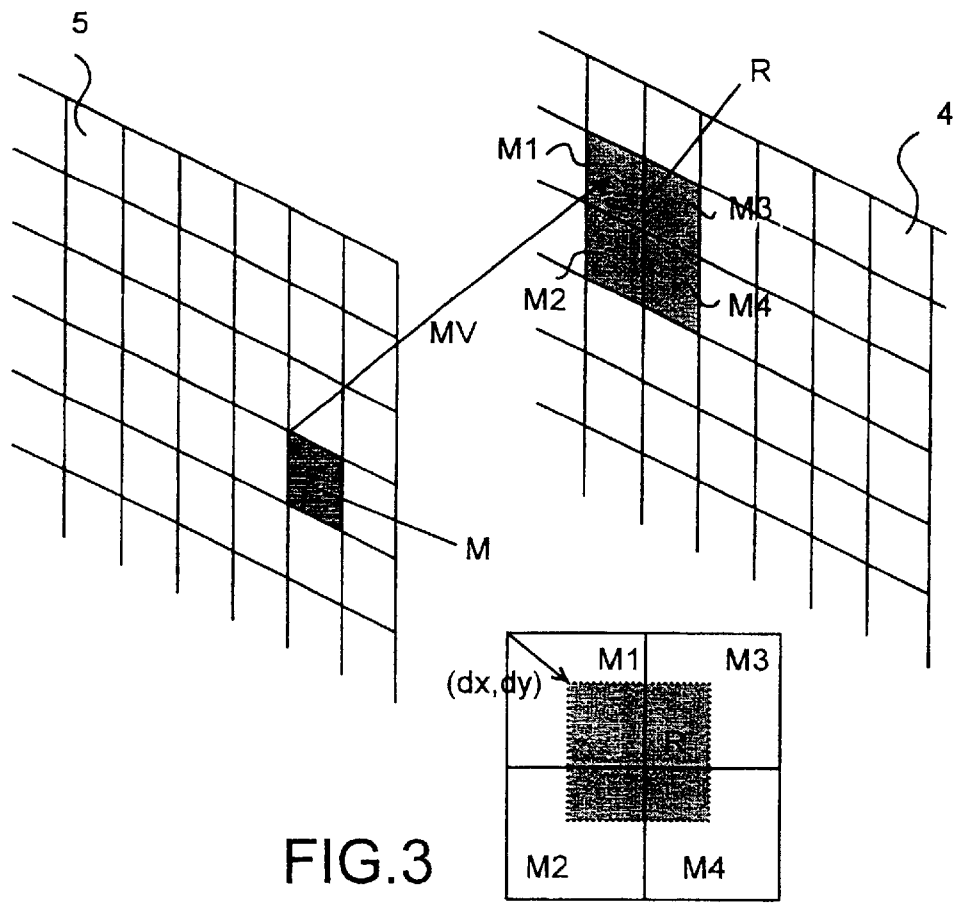
FIG. 3 illustrates the prediction of a macroblock of a current picture with reference to a previous picture.

A basic motion compensation process will now be explained, showing how, in an embodiment of the invention, this motion compensation may be combined with a possible field/frame conversion. In this embodiment of the invention, frames are in the 4:2:0 DCT format and each frame is subdivided into a two-dimensional array of DCT macroblocks, each macroblock consisting of one U-chrominance 8×8 DCT block, one V-chrominance 8×8 DCT block, and four luminance 8×8 DCT blocks. FIG. 3 shows a macroblock M belonging to a current picture 5. The aim of the motion compensation process is to get a predicted macroblock P(M), i.e. a prediction of the macroblock M. A previous picture 4, whose corresponding erroneous macroblocks are stored in the memory unit MEM, serves as a picture reference for the prediction of the macroblock M. In the pixel domain, a macroblock R is obtained by a translation based on a motion vector MV associated with M and with the coordinates (Vx, Vy) in the reference picture 4. The motion vector MV is given by the decoder VLD in this embodiment of the invention. The macroblock R serves as a block reference in order to obtain components of the chrominance and luminance blocks of the macroblock P(M). The macroblock R is straddling four macroblocks M1, M2, M3, M4, which are therefore used as references for the prediction of the macroblock M. For deriving P(M), motion compensation has to be performed on chrominance data and on luminance data on the basis of the respective chrominance and luminance blocks of the four macroblocks M1, M2, M3, M4.

Figure 4:
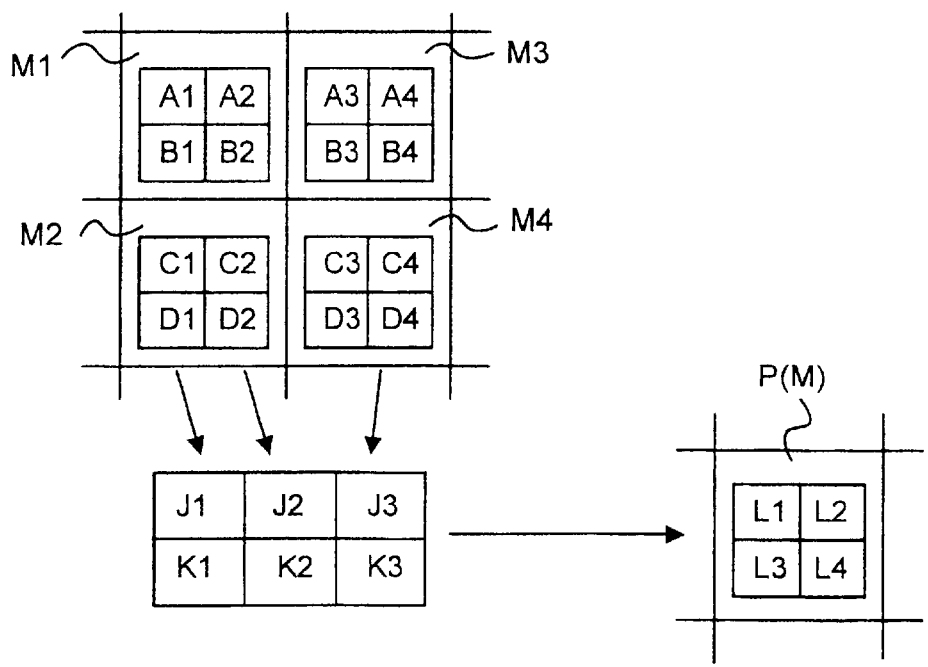
FIG. 4 illustrates the derivation of the prediction of luminance blocks, FIG. 5 gives a 16×16 de-interlacing matrix.

Motion compensation of luminance data is depicted in FIG. 4. It shows the four reference macroblocks M1, M2, M3, M4 with their respective four luminance 8×8 DCT blocks Aj, Bj, Cj, Dj (j=1 ... 4). The motion compensation step of luminance data involves a vertical motion compensation leading to six luminance 8×8 DCT blocks J1, J2, J3, K1, K2 and K3 followed by a horizontal motion compensation leading to four luminance 8×8 DCT blocks L1, L2, L3 and L4. J1, J2, J3, K1, K2, K3, L1, L2, L3 and L4 are computed as follows:

$$\begin{bmatrix} L1 & L2 \\ L3 & L4 \end{bmatrix} = \begin{bmatrix} J1 & J2 & J3 \\ K1 & K2 & K3 \end{bmatrix} \begin{bmatrix} H1(dx)^t & 0 \\ H2(dx)^t & H1(dx)^t \\ 0 & H2(dx)^t \end{bmatrix} \quad (1)$$

and for i=1, 2, 3:

$$\begin{bmatrix} Ji \\ Ki \end{bmatrix} = \begin{cases} \begin{bmatrix} XA(dy) & XB(dy) \\ YA(dy) & YB(dy) \end{bmatrix}\begin{bmatrix} Ai \\ Bi \end{bmatrix} + \begin{bmatrix} XC(dy) & XD(dy) \\ YC(dy) & YD(dy) \end{bmatrix}\begin{bmatrix} Ci \\ Di \end{bmatrix}, 0 \le dx < 16 \\ \begin{bmatrix} XA(dy) & XB(dy) \\ YA(dy) & YB(dy) \end{bmatrix}\begin{bmatrix} A(i+1) \\ B(i+1) \end{bmatrix} + \begin{bmatrix} XC(dy) & XD(dy) \\ YC(dy) & YD(dy) \end{bmatrix}\begin{bmatrix} C(i+1) \\ D(i+1) \end{bmatrix}, 16 \le dx < 32 \end{cases} \quad (2)$$

where (dx, dy) in half-pixels is the motion of the macroblock reference R from the top left corner of the four macroblocks area {M1, M2, M3, M4} (0≦dx<32; 0≦dy<32), where H1(dx) and H2(dx) are 8×8 horizontal prediction matrices, whose coefficients depend on the value of dx and correspond to the horizontal motion compensation. $H_1(dx)^t$ and $H_2(dx)^t$ are their respective transpose matrices.

where XA, XB, YA, YB, are 8×8 vertical prediction matrices, whose coefficients depend on the value of dy. Their elements also depend on the expected format of the macroblock P(M) and the format of the blocks Ai and Bi, where XC, XD, YC, YD are 8×8 vertical prediction matrices, whose coefficients depend on the value of dy and correspond to the vertical motion compensation. Their elements also depend on the expected format of the macroblock P(M) and the format of the blocks Ci and Di.

The elements of these matrices can be computed beforehand for all possible parameters (prediction modes, DCT-format and motion vectors (dx,dy)). As many matrices are found to be identical, a single occurrence of each matrix is stored and indexed. Matrices are retrieved from a look-up table which gives the matrix as a function of the parameters.

A choice for the prediction mode has to be made so that the matrices of equations (1) and (2) can be computed once for all. In this embodiment of the invention, the prediction mode chosen is the frame prediction. Let us introduce a matrix $\Gamma_{16}$ given in FIG. 5. $\Gamma_{16}$ is a 16×16 de-interlacing matrix for converting a frame in the spatial domain in the field format into a frame in the spatial domain in the frame format. $\Gamma_{16}{}^t$ is the transpose matrix of $\Gamma_{16}$. A matrix $\Delta(r,c)$ ($0 \leq r < 8$, $0 \leq c < 8$) is also defined as the 8×8 discrete cosine transform matrix:

$$\Delta(r, c) = \begin{cases} \dfrac{\sqrt{2}}{4} & r = 0 \\ \dfrac{1}{2}\cos\dfrac{\pi(2c+1)}{16} & \text{otherwise} \end{cases}$$

And a matrix $S_N(k)$ is also defined as the N×N matrix:

with ones on the $(k/2)^{th}$ upper diagonal if k is even and positive, with ones on the $(-k/2)^{th}$ lower diagonal if k is even and negative, which is equal to $(S_N(k-1)+S_N(k+1))/2$, otherwise.

Thus, in the embodiment of the invention, a frame prediction mode is chosen for the horizontal motion compensation of the luminance components, which gives the following horizontal prediction matrices H1(dx) and H2(dx):

$$H1(dx) = \frac{1}{16}\text{round}(16 \Delta S_8(dx) \Delta^t) \quad (3)$$

$$H2(dx) = \frac{1}{16}\text{round}(16 \Delta S_8(dx - 16) \Delta^t)$$

Similarly, in this embodiment of the invention, the same arbitrary frame prediction mode is chosen for the vertical motion compensation of the luminance components, which gives the following vertical prediction matrices XA(dy), YA(dy), XB(dy), YB(dy), XC(dy), YC(dy), XD(dy), YD(dy):

$$\begin{bmatrix} XA(dy) & XB(dy) \\ YA(dy) & YB(dy) \end{bmatrix} = \quad (4)$$

$$\frac{1}{16}\text{round}\left( 16 \begin{bmatrix} \Delta & 0 \\ 0 & \Delta \end{bmatrix} \underbrace{(\Gamma_{16})}_{[1]} S_{16}(dy) \underbrace{(\Gamma'_{16})}_{[2]} \begin{bmatrix} \Delta^t & 0 \\ 0 & \Delta^t \end{bmatrix} \right)$$

$$\begin{bmatrix} XC(dy) & XD(dy) \\ YC(dy) & YD(dy) \end{bmatrix} =$$

$$\frac{1}{16}\text{round}\left( 16 \begin{bmatrix} \Delta & 0 \\ 0 & \Delta \end{bmatrix} \underbrace{(\Gamma_{16})}_{[1]} S_{16}(dy - 16) \underbrace{(\Gamma'_{16})}_{[3]} \begin{bmatrix} \Delta^t & 0 \\ 0 & \Delta^t \end{bmatrix} \right)$$

The subscripts [1], [2] and [3] in the equations of set (4) adjoined to the matrices $\Gamma_{16}$ and $\Gamma_{16}^t$ indicate whether the corresponding matrix should be integrated into the equation or not. The subscript [1] indicates that the matrix $\Gamma_{16}$ is taken into account in both equations of set (4) if the macroblock M to be predicted is in the frame format, otherwise it is not. Similarly the subscript [2] indicates that the matrix $\Gamma_{16}^t$ is integrated into the first equation if the blocks Ai and Bi are in the field format. The subscript [3] indicates that the matrix $\Gamma_{16}^t$ is integrated into the second equation if the blocks Ci and Di are in the field format.

The choice of the frame prediction mode is by no means a limitation of the invention and a top field or bottom field prediction mode could be chosen and would lead to different compensation matrices. In this embodiment of the invention, the motion compensation step proposed for the luminance components is applicable to any macroblock no matter its format. A similar calculation is now given for the motion compensation of the chrominance components.

Figures 5, 6:
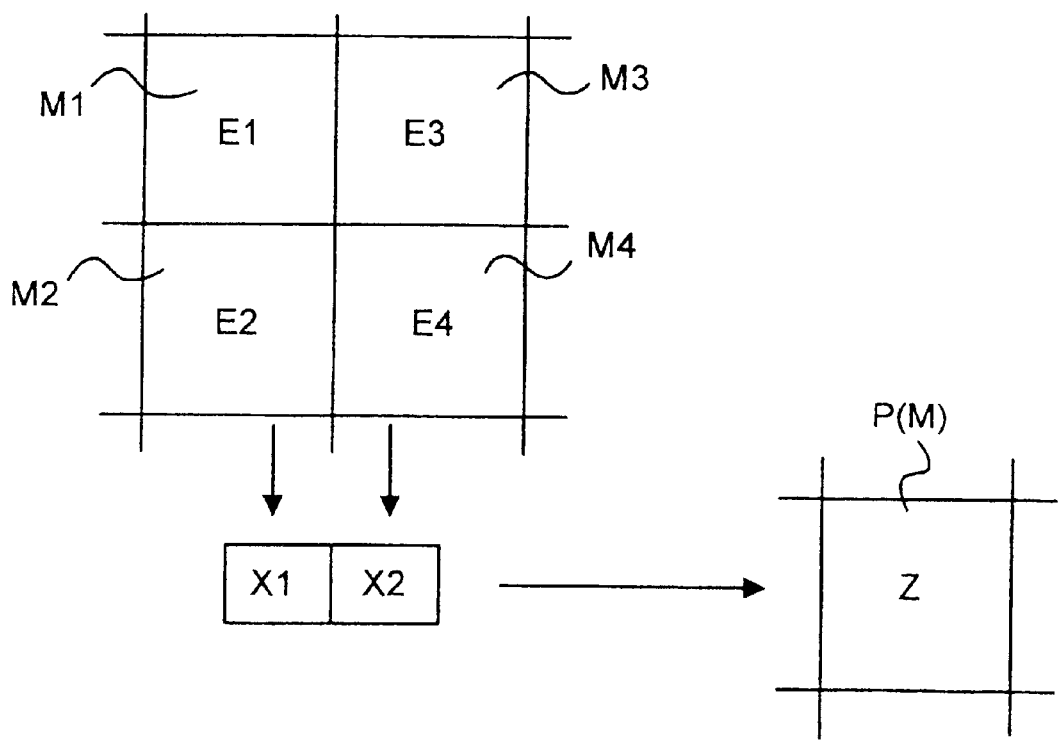
FIG. 6 illustrates the derivation of the prediction of chrominance blocks.

Motion compensation of chrominance data is depicted in FIG. 6. In this embodiment of the invention, the motion vector used for the prediction of the chrominance blocks is the same as the one previously used for the prediction of the luminance blocks. However, it is scaled according to the chrominance format, for which in the 4:2:0 format both horizontal and vertical components are divided by 2 since the chrominance components are half as dense as the luminance components. This motion vector may, in some cases, be slightly different. The four reference macroblocks M1, M2, M3, M4 are shown with their respective chrominance 8×8 DCT blocks Ek (k=1, 2, 3, 4). Due to rounding errors in the scaling of the Vx and Vy components of the motion vector, the macroblocks M1, M2, M3 and M4 in FIG. 6 may not be the same as the macroblocks M1, M2, M3 and M4 in FIG. 4. The motion compensation step according to the invention first involves a vertical motion compensation leading to two chrominance 8×8 DCT blocks X1, X2 followed by a horizontal motion compensation leading to a chrominance 8×8 DCT block Z of the predicted macroblock P(M). Z, X1 and X2 are computed as follows:

$$\begin{cases} Z = X1 \times H1(dx')^t + X2 \times H2(dx')^t \\ X1 = VA(dy') \times E1 + VB(dy') \times E2 \\ X2 = VA(dy') \times E3 + VB(dy') \times E4 \end{cases} \quad (5)$$

where (dx', dy') in half-pixels is the motion of the macroblock reference R from the top left corner of the four macroblocks area {M1, M2, M3, M4} (dx'=dx/2, dy'=dy/2). H1(dx'), H2(dx'), $H_1(dx')^t$, $H_2(dx')^t$ are the same as for the calculation of the luminance components, where VA(dy') and VB(dy'), corresponding to the vertical motion compensation, are the 8×8 vertical prediction matrices whose coefficients depend on the value of dy'.

The same prediction mode is chosen for the vertical motion compensation of the chrominance components, which gives the following arbitrarily chosen vertical prediction matrices VA(dy') and VB(dy'):

$$VA(dy') = \frac{1}{16}\text{round}(16 \Delta S_8(dy') \Delta^t) \quad (6)$$

$$VB(dy') = \frac{1}{16}\text{round}(16 \Delta S_8(dy' - 16) \Delta^t)$$

Figure 7:
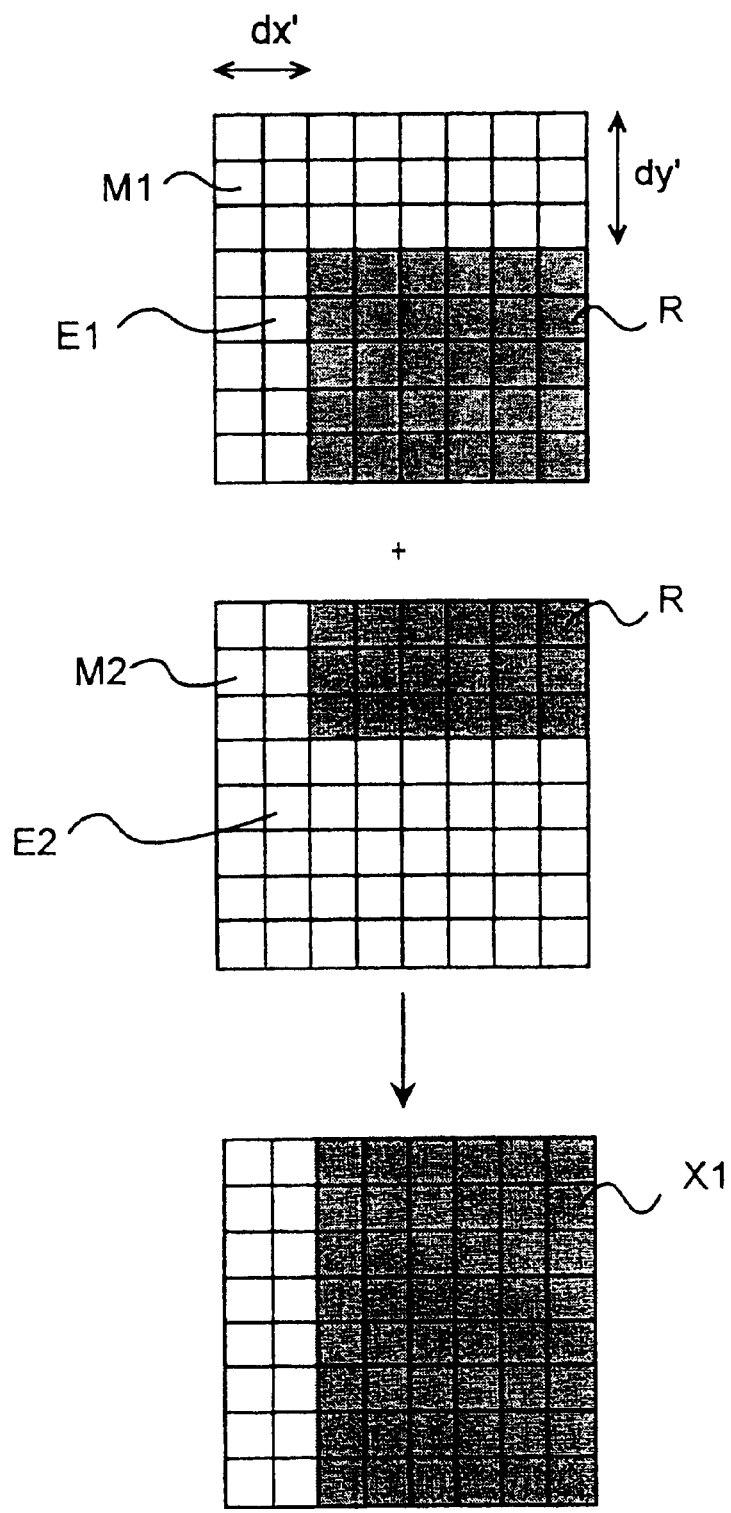
FIG. 7 illustrates the vertical prediction of the chrominance components.

An illustration of part of the calculation of the vertical prediction of the chrominance components performed in the set (5) is given in FIG. 7. It shows the macroblocks M1 and M2 with their respective 8×8 pixel blocks IDCT(E1), IDCT (E2) resulting from an inverse discrete cosine transform of E1 and E2. It also shows part of the macroblock R, shaded in the figure. The vertical prediction calculation leads to a macroblock X1. In this example dx=4 and dy=6. The shaded components of 8×8 DCT block X1 are obtained by rounding by the function $$\frac{1}{16}$$

round (16 . . . ) of the shaded components of the DCT luminance blocks E1, E2 on FIG. 7.

These proposed prediction matrices VA(dy'), VB(dy'), XA(dy), YA(dy) XB(dy), YB(dy), XC(dy), YC(dy), XD(dy), YD(dy) by no means represent a limitation of the invention. Indeed, the mathematical averaging function $$\frac{1}{16}$$

round (16 . . . ) is arbitrarily chosen and other prediction functions may be used, depending on the required precision of the derived components. In this embodiment of the invention, a frame prediction mode is chosen and the given prediction matrices are arbitrarily chosen. Different matrices will be derived in the case of a field-based prediction. A field-based prediction involves two motion vectors of different values for a given macroblock: a first motion vector indicates the macroblock in the reference picture used for the prediction of the top field of the macroblock, and the second motion vector indicates the macroblock in the reference picture used for the prediction of the bottom field of the macroblock. The prediction of the macroblock itself is the sum of the predictions of the two fields. This leads to two more sets of prediction matrices : one for the prediction of the top field based on the first motion vector and one for the prediction of the bottom field based on the second motion vector. Furthermore, each set of prediction matrices can lead to even more alternatives, considering that each field may either be predicted from a top field or a bottom field.

What is claimed is:

1. A method of transcoding an input coded signal comprising the steps of:
    decoding the input coded signal leading to a decoded quantized signal,
    dequantizing the decoded quantized signal leading to a decoded signal,
    requantizing a compensated signal leading to a requantized signal,
    reencoding the requantized signal leading to a reencoded signal,
    compensating a drift introduced in the reencoded signal by said requantization step,
    said compensation step being performed between said dequantizing and requantizing steps,
    wherein said drift compensation step comprises at least the consecutive sub-steps of:
        deriving an error signal corresponding to said drift,
        deriving a prediction signal of the decoded signal by performing either a field prediction or frame prediction based on a format of the error signal and adapted to the interlaced or non-interlaced transmission form of the error signal and of the prediction signal,
        subtracting the derived prediction signal from the decoded signal, leading to the compensated signal to be requantized.

2. A method of transcoding an input coded signal as claimed in claim 1, wherein the input coded signal is composed of successive video frames divided into spatially non-overlapping macroblocks encoded in the frequency domain, the prediction signal being, then, a prediction macroblock, and the derivation of this prediction macroblock being only performed for macroblocks previously encoded according to an Inter mode.

3. A method of transcoding an input coded signal as claimed in claim 1, wherein the input coded signal is composed of successive video frames divided into spatially non-overlapping macroblocks encoded in the frequency domain, the prediction signal being, then, a prediction macroblock, and the derivation of the prediction macroblock of a macroblock belonging to a B-frame is performed on the basis of the error macroblocks of a future frame only.

4. A transcoder having:
    a decoder for decoding an input coded bit stream and providing a decoded quantized signal,
    a dequantizer for dequantizing the decoded quantized signal and providing a decoded signal,
    a quantizer for requantizing a compensated signal and providing a requantized signal,
    an encoder for re-encoding the requantized signal and providing a re-encoded signal,
    means for compensating a drift introduced in the re-encoded signal by said quantizer,
    said compensation means introducing a compensation between the dequantizer and the quantizer,
    wherein the means for compensating the drift comprise
        a unit for deriving an error signal corresponding to said drift,
        a unit for deriving a prediction signal of said decoded signal by performing either a field prediction or frame prediction based on a format of the error signal and adapted to the interlaced or non-interlaced transmission form required for the error signal and for the prediction signal,
        an adder for subtracting the derived prediction signal from the decoded signal, leading to the compensated signal.

* * * * *